US007428451B2

(12) United States Patent
Artini et al.

(10) Patent No.: US 7,428,451 B2
(45) Date of Patent: Sep. 23, 2008

(54) METHOD AND DEVICE FOR ENSURING THE SAFETY OF A LOW-ALTITUDE FLIGHT OF AN AIRCRAFT

(75) Inventors: Franck Artini, Toulouse (FR); Jacques Espinasse, Pibrac (FR)

(73) Assignee: AIRBUS France, Toulouse (FR)

( * ) Notice: Subject to any disclaimer, the term of this patent is extended or adjusted under 35 U.S.C. 154(b) by 576 days.

(21) Appl. No.: 11/121,055

(22) Filed: May 4, 2005

(65) Prior Publication Data

US 2005/0273223 A1    Dec. 8, 2005

(30) Foreign Application Priority Data

May 18, 2004   (FR)   .................................. 04 05380

(51) Int. Cl.
*G01C 5/00* (2006.01)
(52) U.S. Cl. ..................... 701/9; 701/3; 701/4; 701/14; 701/120
(58) Field of Classification Search ................ 701/3–6, 701/8–9, 10, 14–16, 23–26, 120, 206; 340/963, 340/965–967; 244/75.1
See application file for complete search history.

(56) References Cited

U.S. PATENT DOCUMENTS 5,922,031 A    7/1999   Larrieu

| 6,020,832 | A   | * | 2/2000  | Jensen        | 340/970 |
|-----------|-----|---|---------|---------------|---------|
| 6,021,374 | A   | * | 2/2000  | Wood          | 701/301 |
| 6,181,987 | B1  | * | 1/2001  | Deker et al.  | 701/3   |
| 6,438,492 | B1  |   | 8/2002  | Le Tallec et al. |      |
| 6,643,580 | B1  | * | 11/2003 | Naimer et al. | 701/206 |
| 6,816,780 | B2  | * | 11/2004 | Naimer et al. | 701/206 |
| 2001/0013836 | A1 |   | 8/2001  | Cowie         |         |
| 2003/0036828 | A1 |   | 2/2003  | Conner et al. |         |

FOREIGN PATENT DOCUMENTS

| EP | 0453327        | 10/1991 |
| GB | 2266286        | 10/1993 |
| WO | 2004079400 A2  | 9/2004  |

OTHER PUBLICATIONS

Preliminary Search Report dated Jan. 5, 2005 with English translation.

* cited by examiner

*Primary Examiner*—Gertrude Arthur Jeangla
(74) *Attorney, Agent, or Firm*—Dickinson Wright, PLLC

(57) ABSTRACT

A method and device for ensuring the safety of a low-altitude flight of an aircraft is disclosed, wherein low-altitude flight is flight along a flight trajectory at low altitude, for example 500 feet, that allows an aircraft to follow as closely as possible the terrain being over-flown. To avoid collision with the terrain, a safety corridor, devoid of any obstacle, is determined which is delimited on either side of the lateral trajectory, and whose width depends on a global uncertainty, and the aircraft is guided along the flight trajectory, avoiding any exit of the aircraft from the safety corridor.

13 Claims, 5 Drawing Sheets

US 7,428,451 B2

METHOD AND DEVICE FOR ENSURING THE SAFETY OF A LOW-ALTITUDE FLIGHT OF AN AIRCRAFT

FIELD OF THE INVENTION

The present invention relates to a method and a device for ensuring the safety of a low-altitude flight of an aircraft being guided along a flight trajectory comprising a lateral trajectory and a vertical trajectory.

The present invention applies more particularly, although not exclusively, to a military transport plane that exhibits a low thrust/weight ratio and a high inertia, and whose maneuvering times are generally relatively slow.

BACKGROUND OF THE RELATED ART

As regards the present invention, low-altitude flight is taken to mean flight along a flight trajectory (at low altitude) that allows an aircraft to follow as closely as possible the terrain being over-flown, in particular to avoid being detected. Such a low-altitude flight trajectory is therefore situated at a predetermined height above the terrain, for example 500 feet (around 150 meters).

By reason of this proximity to the ground, any lateral or downward vertical swerve (beyond a certain safety margin) of the aircraft, with respect to the flight trajectory to be followed, as the aircraft is guided along said flight trajectory, presents a high risk of collision with the terrain being over-flown (directly with the ground or with a construction or an element situated on said ground). Of course, the existence of such a risk is not acceptable.

SUMMARY OF THE INVENTION

An object of the present invention is to remedy this drawback. It relates to a method of ensuring the safety of a low-altitude flight of an aircraft (which is guided along a flight trajectory comprising a lateral trajectory and a vertical trajectory), which makes it possible to render any collision of the aircraft with the terrain overflown highly improbable.

To this end, according to the invention, said method is noteworthy in that:

a safety corridor, devoid of any obstacle, is determined which is delimited on either side of said lateral trajectory, and whose width depends on a global uncertainty; and the aircraft is guided along said flight trajectory, avoiding any exit of this aircraft from said safety corridor.

Thus, as the safety corridor is devoid of any obstacle (by reason of characteristics specified hereinbelow), in particular of any terrain part such as a peak for example, the risk of collision for the aircraft during the low-altitude flight along said flight trajectory is minimized, as long as said aircraft remains in this safety corridor.

Advantageously, said global uncertainty depends:

on an uncertainty relating to the position of the aircraft;

on an uncertainty relating to a terrain profile used to construct said flight trajectory; and on an uncertainty relating to the guiding of the aircraft along a trajectory.

In a particular embodiment, said safety corridor is delimited, in the vertical plane, at the bottom, by the highest part of the terrain existing under an uncertainty surface (or surface of extraction from a safety terrain profile). Preferably, this uncertainty surface also depends:

on an uncertainty relating to the position of the aircraft;

on an uncertainty relating to a terrain profile used to construct said flight trajectory; and on an uncertainty relating to the guiding of the aircraft along a trajectory.

Furthermore, advantageously, said uncertainty surface exhibits the width of said safety corridor.

In a preferred embodiment, an operational corridor is moreover determined which delimits a volume of normal deployment of the aircraft defined about the flight trajectory, both in a vertical plane and in a horizontal plane, and which is such that an exit of the aircraft from said operational corridor is compensatable through a steering (manual or automatic) of the aircraft, before an exit of said aircraft from the safety corridor.

By virtue of said operational corridor and of a compensation steering if necessary, it is possible to anticipate an exit of the aircraft from said safety corridor, and hence to minimize the risk of collision of the aircraft with the terrain. The low-altitude flight of the aircraft is therefore made safe.

Advantageously, during the guidance of the aircraft along the flight trajectory, a check is performed to verify whether the aircraft is situated inside the operational corridor; and an alarm signal of exit of the aircraft from said operational corridor is emitted, as appropriate.

With the aim of maximum safety, advantageously, said alarm signal is emitted in an anticipated manner, before the actual exit of the aircraft from said operational corridor.

In this case, firstly, for an exit from the operational corridor corresponding to an excessive lateral swerve with respect to the lateral trajectory, the anticipated emission of the alarm signal advantageously takes account:

of the deviation of course of the aircraft with respect to said lateral trajectory;

of the value of the horizontal acceleration of the aircraft, projected onto an axis perpendicular to said lateral trajectory; and of the horizontal speed of the aircraft, projected onto said axis.

Moreover, secondly, for an exit from the operational corridor corresponding to an excessive vertical swerve with respect to the vertical trajectory, the anticipated emission of the alarm signal advantageously takes account:

of the deviation of slope of the aircraft with respect to the slope of said vertical trajectory;

of the value of the vertical acceleration of the aircraft, projected onto an axis perpendicular to said vertical trajectory; and of the vertical speed of the aircraft, projected onto said axis.

The present invention also relates to a device for ensuring the safety of low-altitude flight of an aircraft.

According to the invention, said device of the type comprising:

first means for determining a flight trajectory comprising a lateral trajectory and a vertical trajectory; and means of guidance and navigation for guiding the aircraft along said flight trajectory, also comprising means of navigation (position, speed and acceleration of the aircraft), is noteworthy in that it moreover comprises:

second means for determining a safety corridor, devoid of any obstacle, which is limited on either side of said lateral trajectory (and which is limited at the bottom by the highest peak of a safe terrain profile under the uncertainty surface, for the relevant abscissa of the lateral trajectory); and third means for avoiding any exit of the aircraft from said safety corridor, during its guidance along said flight trajectory.

Said device in accordance with the invention therefore makes it possible to minimize the risk of collision of the aircraft with an obstacle and thus to ensure the safety of the low-altitude flight.

In a particular embodiment, said third means comprise:

means for determining an operational corridor;

means for verifying that the aircraft is situated inside said operational corridor, during its guidance along said flight trajectory;

means for emitting as appropriate an alarm signal of exit of the aircraft from said operational corridor; and means of steering making it possible to bring the aircraft inside said operational corridor upon the emission of an alarm signal.

BRIEF DESCRIPTION OF THE DRAWINGS

The figures of the appended drawing will elucidate the manner in which the invention may be embodied. In these figures, identical references designate similar elements.

DETAILED DESCRIPTION OF THE INVENTION

Figure 1:
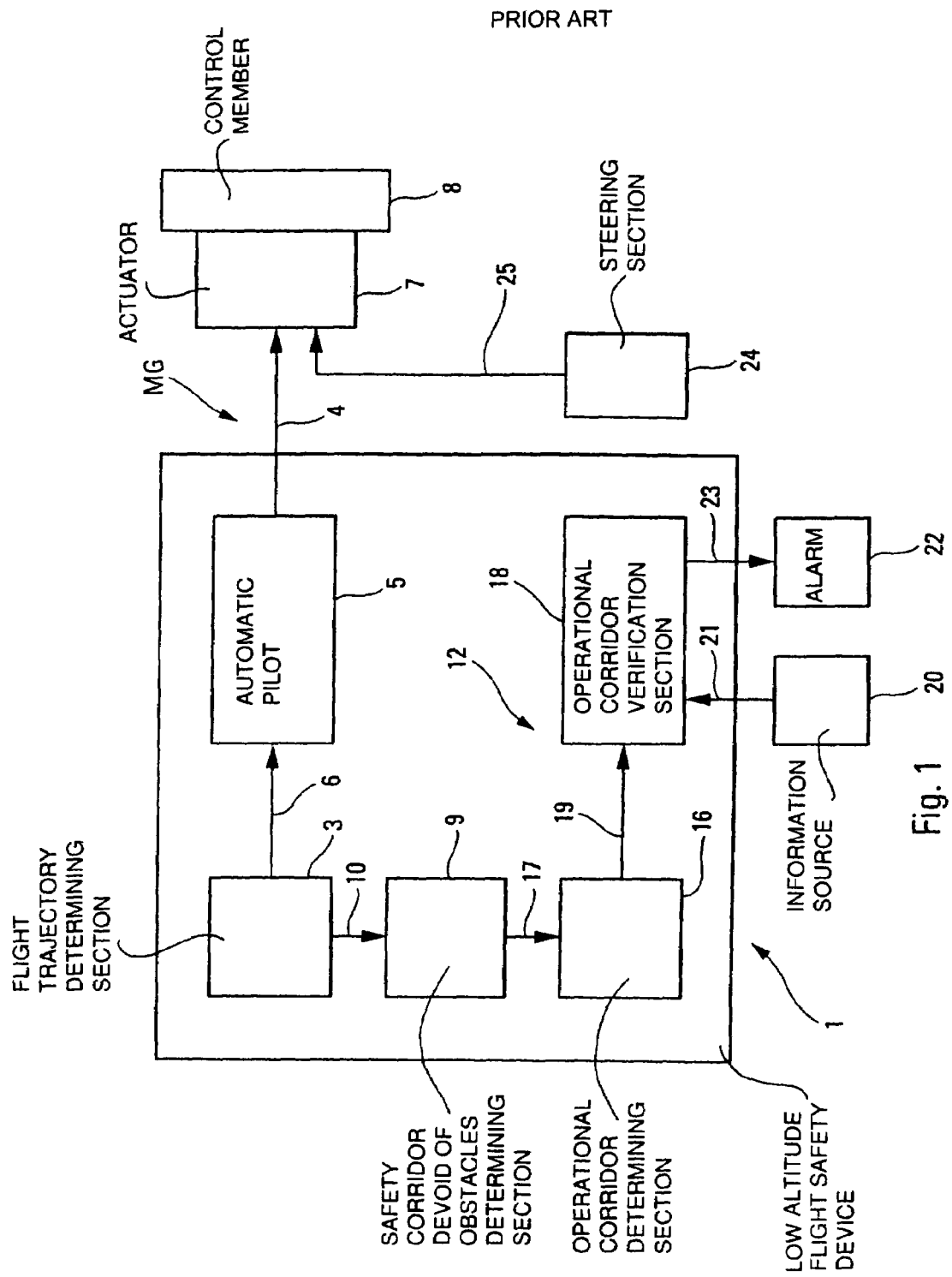
FIG. 1 is the schematic diagram of a device in accordance with the invention.

The device 1 in accordance with the invention and represented diagrammatically in FIG. 1 is intended to ensure the safety of the low-altitude flight of an aircraft A, in particular a military transport plane.

To do this, said device 1 is of the type comprising:

standard means 3 for determining a flight trajectory TO comprising a lateral trajectory TL defined in a horizontal plane and a vertical trajectory TV (or flight profile) defined in a vertical plane. To be able to carry out a low-altitude flight, the flight trajectory TO (at low altitude) must allow the aircraft A to follow as closely as possible the terrain overflown 2; and standard means of guidance and navigation MG for guiding the aircraft A along said flight trajectory TO. In a preferred embodiment, said means of guidance MG comprise:

means 5, for example an automatic pilot, which are connected by a link 6 to said means 3 for determining orders for steering the aircraft A so that it follows said flight trajectory TO; and means of actuation 7 of controlled members 8 such as for example rudder, elevators of the aircraft A, means of actuation 7 which are connected by a link 4 to said means 5 and to which the steering orders determined by the latter are applied.

Figure 2:
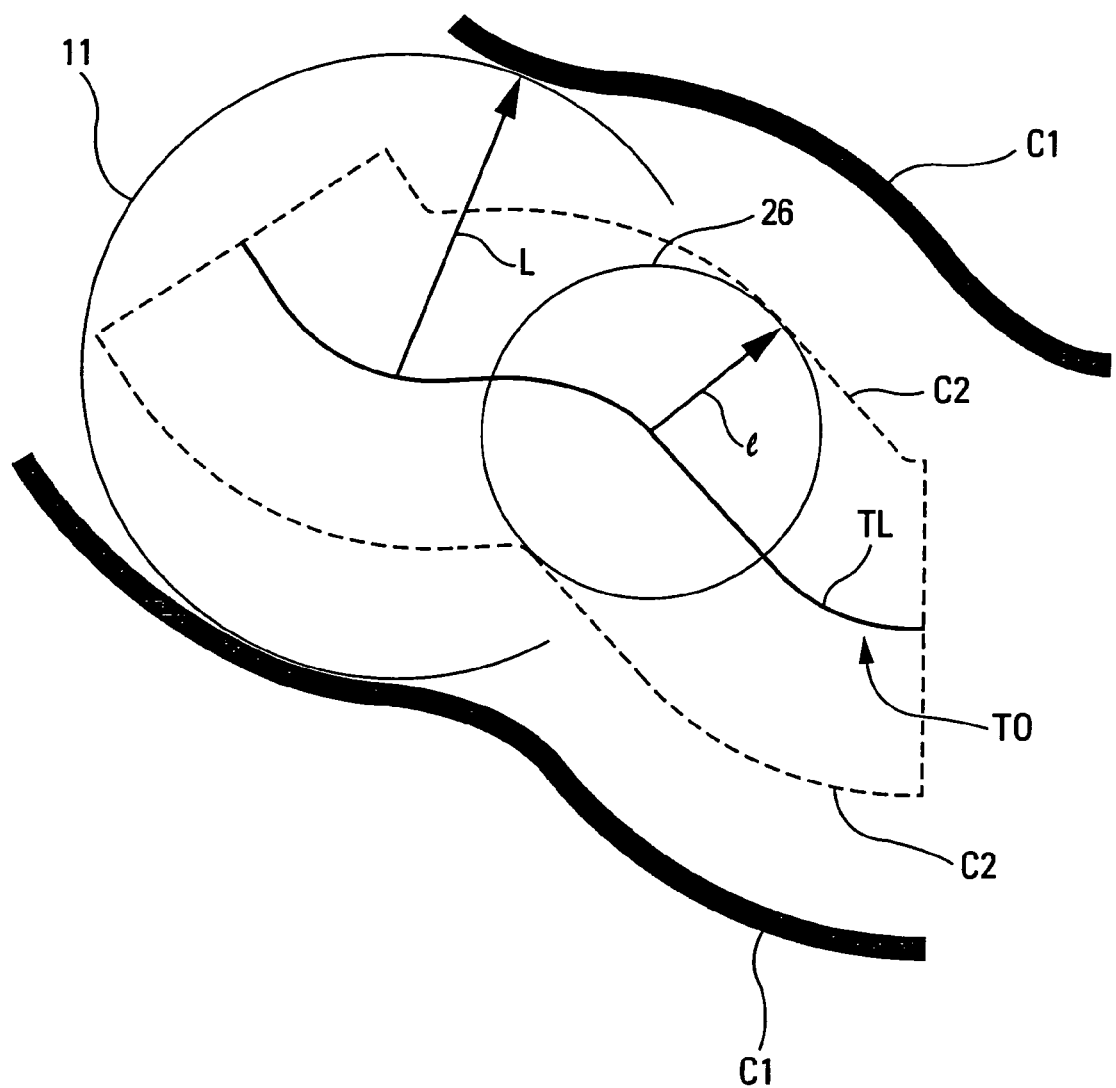
FIGS. 2 and 3 diagrammatically illustrate characteristics of the invention, respectively in a horizontal plane and in a vertical plane.

According to the invention, said device 1 furthermore comprises:

means 9 which are connected by a link 10 to said means 3, for determining a safety corridor C1, which is devoid of any obstacle (by reason of characteristics specified hereinbelow), which is delimited on either side of said lateral trajectory TL, and whose width 2L (which is represented in FIG. 2 as double the radius L of a circle 11) depends on a global uncertainty (and which reflects the maximum probability that one wishes to assign to the event corresponding to the exit from the safety corridor); and means 12 specified hereinbelow, for avoiding any exit of the aircraft A from said safety corridor C1, during its guidance along said flight trajectory TO.

Thus, as the safety corridor C1 is by definition devoid of any obstacle, in particular of any terrain part 2 such as a peak for example, the risk of collision for the aircraft A during the low-altitude flight along said flight trajectory TO is minimized, as long as said aircraft A is maintained in this safety corridor C1 by virtue of the action of said means 12.

To determine this safety corridor C1, said means 9 take account of a plurality of uncertainties existing during a low-altitude flight, which are grouped into a global uncertainty. More precisely, according to the invention, this global uncertainty takes account in particular:

of an uncertainty relating to the position of the aircraft A;

of an uncertainty relating to a terrain profile used to construct said flight trajectory TO; and of an uncertainty relating to the guiding of the aircraft A along a trajectory.

Figure 3:
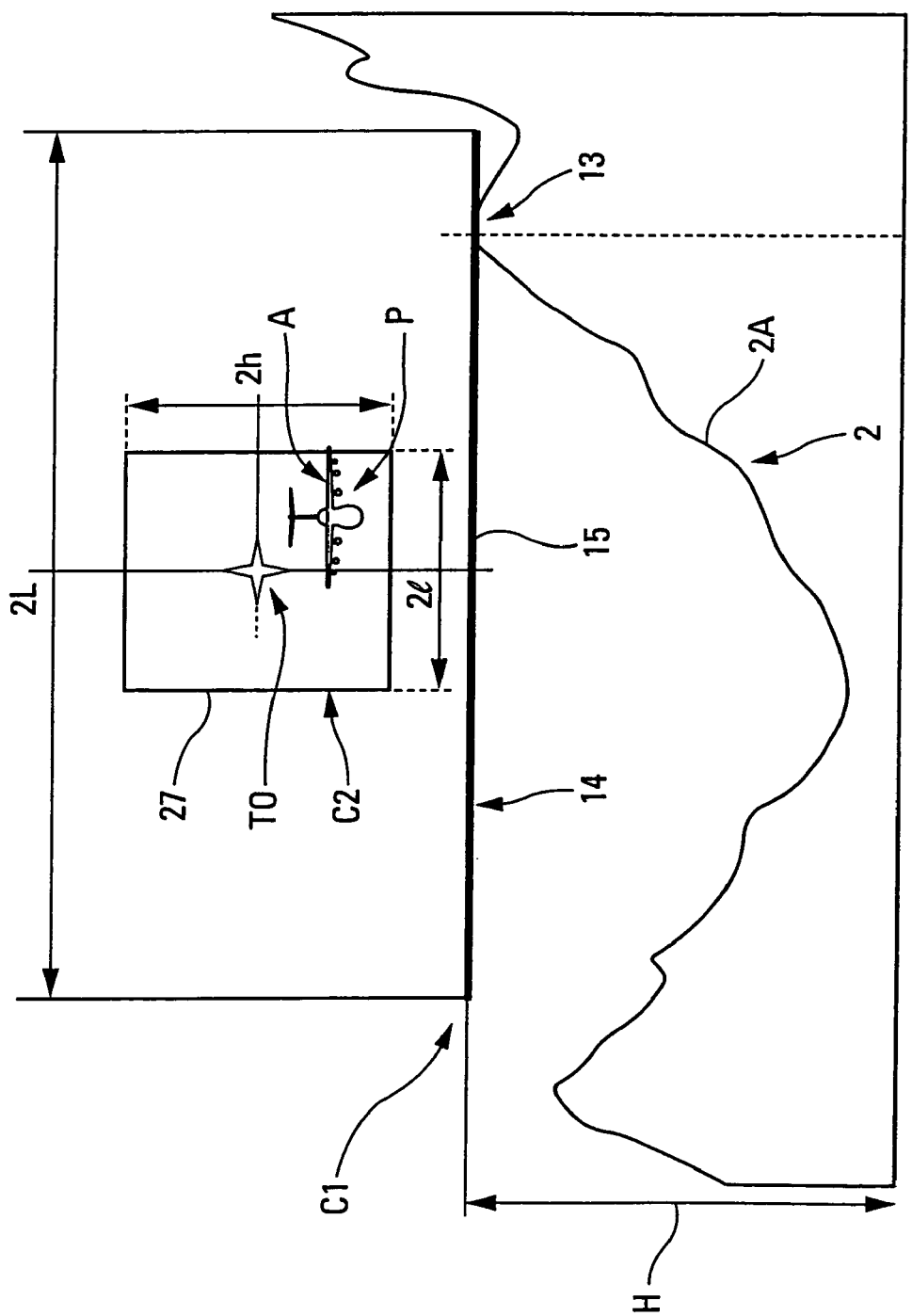

Represented in FIG. 2 is the safety corridor C1 in a horizontal plane, and in FIG. 3 in a vertical plane.

In the vertical plane, said safety corridor C1 is not delimited at the top, but it is delimited at the bottom, by the highest part 13 of the terrain 2 (whose relief 2A has been represented in FIG. 3) which exists under a horizontal uncertainty surface 14 (or surface of extraction from a safe terrain profile). This part 13 exhibits an altitude H. In a preferred embodiment, said uncertainty surface 14 is determined, taking account in particular of the aforesaid uncertainties, namely:

the uncertainty relating to the position of the aircraft A;

the uncertainty relating to a (digital) terrain profile used to construct said flight trajectory TO; and the uncertainty relating to the guiding of the aircraft A along a trajectory.

Said uncertainty surface 14 which is a horizontal surface is centered with respect to the lateral trajectory TL of the flight trajectory TO. It may exhibit in particular a square or rectangular shape or one elongated in the direction of said lateral trajectory TL (as a function of the uncertainties in the various lateral directions and along the trajectory).

Preferably, it exhibits the width 2L of the safety corridor C1. Thus, in the representation of FIG. 3 which corresponds to the latter situation, the safety corridor C1 and the uncertainty surface 14 are represented by one and the same straight segment 15.

In a preferred embodiment, said means 3 determine the vertical trajectory TV (or flight profile) of the flight trajectory TO, not directly from the terrain profile which emanates for example from a digital database and which exhibits a certain margin of error, but from a safe terrain profile which takes account of a plurality of error margins or existing uncertainties, including that relating to the accuracy of the database. This makes it possible to obtain a vertical trajectory TV eliminating any risk of collision of the aircraft A with the ground, while enabling the terrain 2 to be followed at low altitude. To do this, said means 3 determine, from the terrain profile received from the digital database, a safe terrain profile which is such that, along said lateral trajectory TL, account is taken, as elevation of the terrain, of the elevation 13 which is the highest under the aforesaid uncertainty surface 14 (or surface of extraction from a safe terrain profile) in such a way as to form an auxiliary profile to which is added a predetermined guard height, for example 500 feet (around 150 meters), so as to obtain said safe terrain profile.

Said means of guidance MG also comprise means of navigation which provide the uncertainty of positioning of the aircraft A, associated with the probability requested. For example, they may provide a surface (of uncertainty) which gives the position of the aircraft A in this surface with a probability of $10^{-9}$ risk of collision per hour of flight.

Furthermore, according to the invention, said means 12 comprise:

means 16 which are connected by a link 17 to the means 9, for determining an operational corridor C2 which is provided inside said safety corridor C1, which delimits a normal volume of deployment of the aircraft A defined about the flight trajectory TO, both in a vertical plane and in a horizontal plane, and which is such that an exit of the aircraft A from said operational corridor C2 is compensatable through a steering of the aircraft A, before an exit of said aircraft A from the safety corridor C1;

means 18 which are connected by a link 19 to said means 16, for verifying that the aircraft A is situated inside said operational corridor C2, during its guidance along said flight trajectory TO. To do this, said means 18 receive information relating to the aircraft A, and in particular its position, from a standard source of information 20 which is connected by a link 21 to said means 18;

means 22 which are connected by a link 23 to said means 18 for emitting, in particular at the level of the flight control deck of the aircraft A, as appropriate an alarm signal, for example of audible type and/or visual type, indicating an exit of the aircraft A from said operational corridor C2; and standard means of steering 24, making it possible to bring the aircraft A inside said operational corridor C2 upon the emission of an alarm signal, by generating steering orders which are transmitted by a link 25 to said means of actuation 7.

Said means of steering 24 may be means of automatic steering, for example an automatic pilot of standard type. However, in a preferred embodiment, said means of steering 24 are standard manual means of steering, which allow a pilot of the aircraft A to carry out by manual steering, as appropriate, the necessary maneuver for compensation or recovery of the flight trajectory TO.

In the horizontal plane, the operational corridor C2 is defined on either side of the lateral trajectory TL, as represented in FIG. 2. It exhibits a width 21 which is illustrated as double the radius 1 of a circle 26.

In the vertical plane, the corridor C2 is presented in the form of a rectangle 27 of width $2l$ and of height $2h$, centered on the flight trajectory TO, as represented in FIG. 3.

Moreover represented in this FIG. 3 is the aircraft A, whose position P (possibly marred by a navigation error) lies inside said operational corridor C2.

Said operational corridor C2 therefore illustrates the volume of normal deployment of the aircraft A as a function of its performance (navigation and guidance performance). An exit from this operational corridor C2 which is included within the safety corridor C1 is therefore signaled to the pilot. The pilot knows that during normal use, by reason of the performance of the aircraft A, he can then bring the latter manually into the operational corridor C2, without the recovery maneuver causing him to exit said safety corridor C1.

It will be noted that:

as indicated previously, the safety corridor C1 is not limited at the top, and its bottom limit is the relief 2A (its highest part 13); and the operational corridor C2 may likewise not be limited at the top, but it is judicious to signal any excessive upward deviation to the pilot, since in this case, in particular the means 5 do not behave normally.

Figure 4:
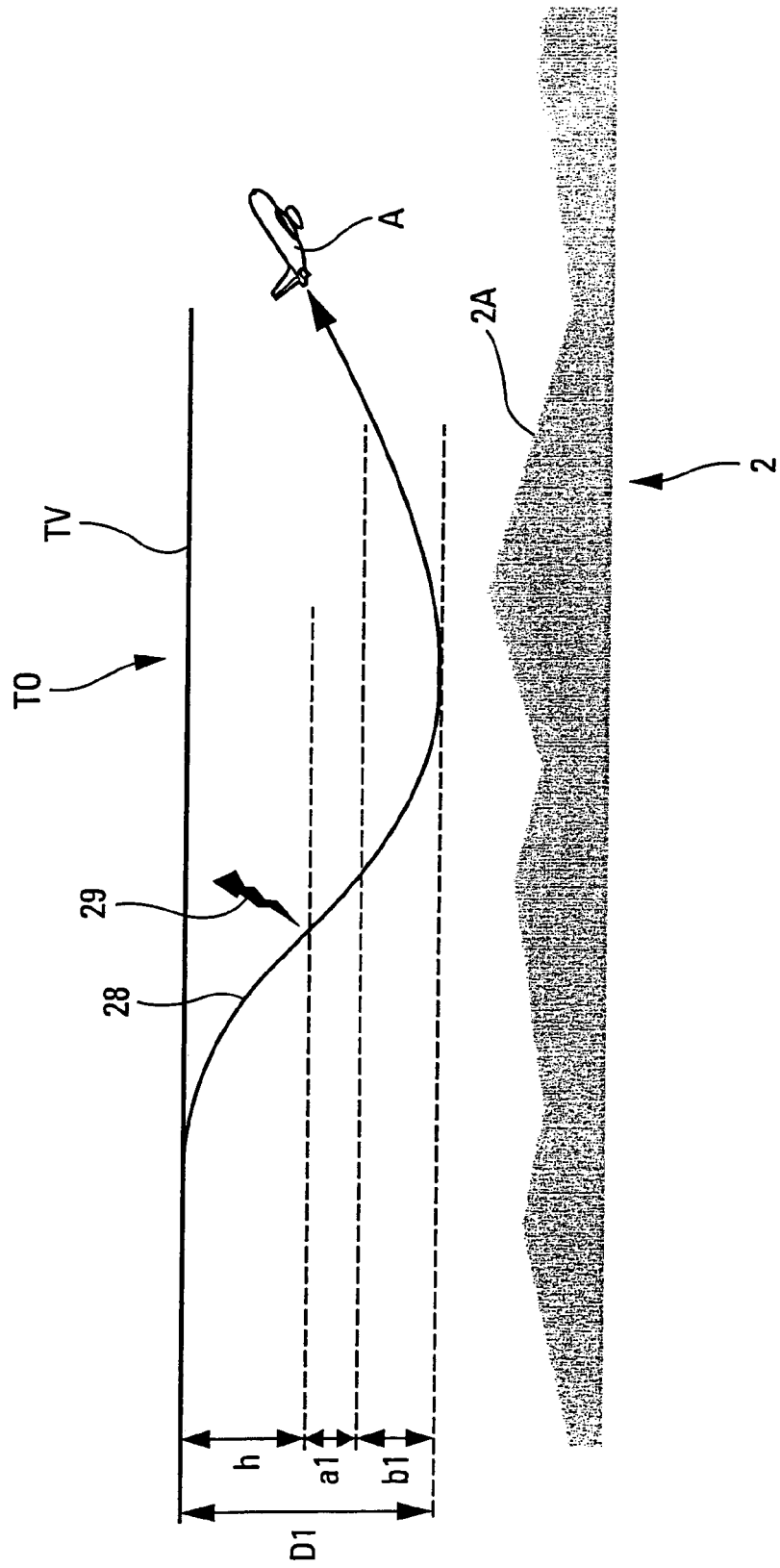
FIGS. 4 and 5 show excessive swerves respectively in a vertical plane and a horizontal plane, giving rise to a recovery maneuver.

Represented in FIG. 4 is an exit of the aircraft A from the operational corridor C2, corresponding to an excessive vertical swerve (downward) with respect to the vertical trajectory TV. This exit is illustrated by the representation of the corresponding trajectory 28 of the aircraft A.

After an excessive vertical swerve by a height h, the aircraft A exits the operational corridor C2, thereby causing the emission of an alarm signal 29 by the means 22 warning the pilot of this exit. By the time he reacts, the aircraft A descends further by a height a1, and then by a height b1, during the time of the recovery maneuver. Ultimately, the aircraft A has deviated by a height D1 from the vertical trajectory TV: D1=h+a1+b1. Hence, for safety reasons the vertical trajectory TV should as a minimum be situated at a height D1 above the highest point of the relief 2A of the terrain 2.

Figure 5:
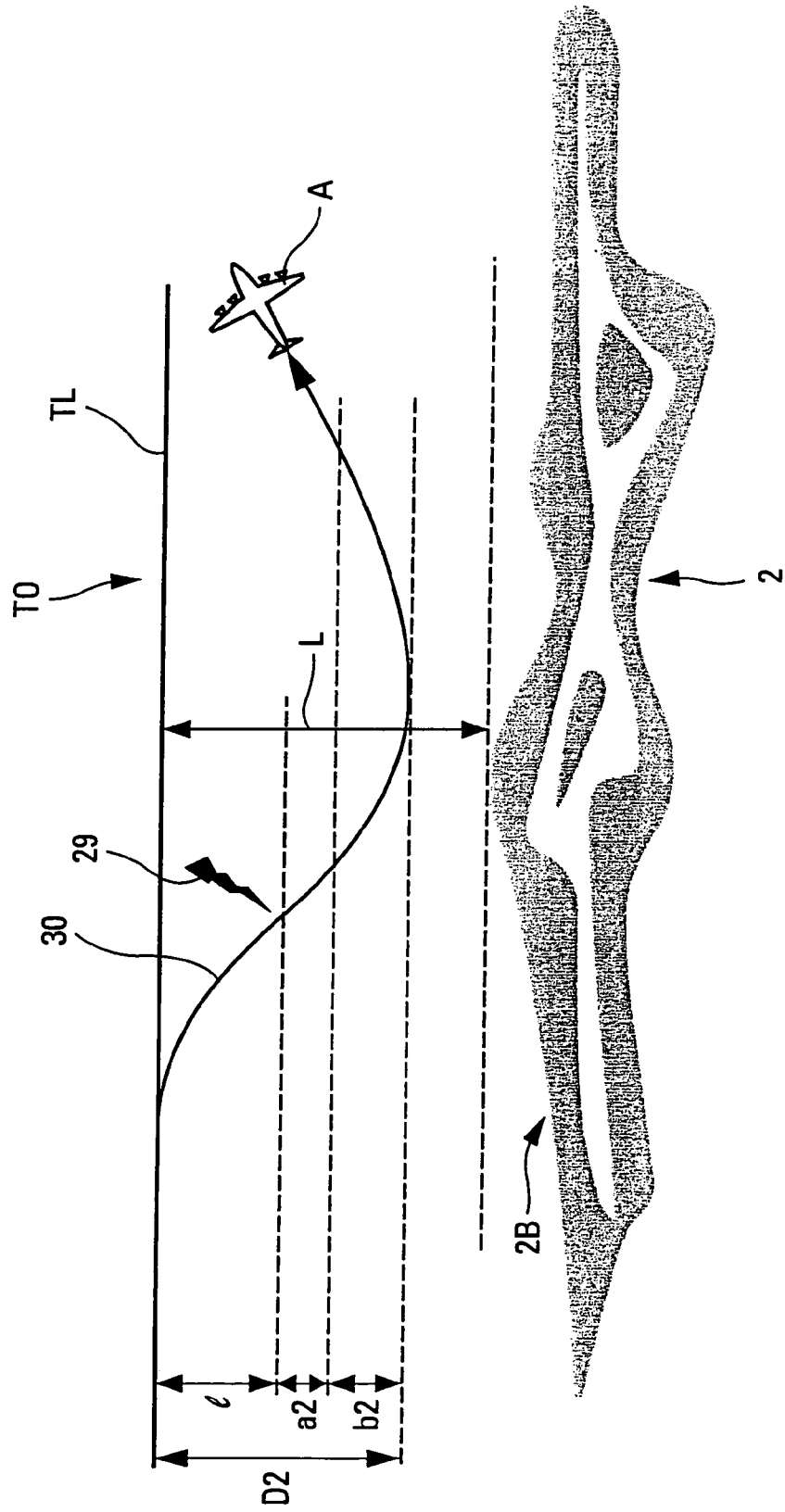

Furthermore, represented in FIG. 5 is an exit of the aircraft A from the operational corridor C2, corresponding to an excessive lateral swerve with respect to the lateral trajectory TL. This exit is illustrated by the representation of the corresponding trajectory 30 of the aircraft A. A lateral expanse 2B of said terrain 2 has moreover been represented.

After an excessive lateral swerve by a distance l, the aircraft A exits the operational corridor C2, thereby causing the emission of an alarm signal 29 by the means 22 warning the pilot of this exit. By the time he reacts, the aircraft A deviates by a distance a2, and then by a distance b2, during the time of the recovery maneuver. Ultimately, the aircraft A has deviated laterally by a distance D2 from the lateral trajectory TL: D2=l+a2+b2. As this distance D2 remains much less than the width L of the safety corridor C1, the corresponding flight (with the recovery maneuver) remains safe.

Consequently, as long as the aircraft A remains in the safety corridor C1, its low-altitude flight is safe. Moreover, before arriving at an exit of the aircraft A from said safety corridor C1, for which the safety of the low altitude flight would no longer be ensured in the horizontal plane, an alarm signal 29 is generated when the aircraft A is situated outside of a normal corridor of use (said operational corridor C2) which is dimensioned in such a way that a recovery maneuver makes it possible to keep the aircraft A in the safety corridor C1.

As, moreover, a downward deviation is dangerous during low-altitude flight, this principle is extended into the vertical plane, at the bottom. At the top there is no safety problem, however, the operational corridor C2 exhibits an upper limit, since an upward exit is indicative of abnormal behavior of the aircraft A with respect to the flight trajectory TO to be followed.

With the aim of maximum safety, said alarm signal 29 is emitted in an anticipated manner, before an actual exit of the aircraft A from said operational corridor C2.

Firstly, for an exit from the operational corridor C2 corresponding to an excessive vertical swerve with respect to the vertical trajectory TV, as represented in FIG. 4, the anticipated emission of the alarm signal 29 takes account:

of the deviation of slope of the aircraft A with respect to the slope of said vertical trajectory TV;

of the value of the vertical acceleration of the aircraft A, projected onto an axis perpendicular to said vertical trajectory TV; and of the vertical speed of the aircraft A, projected onto said axis.

Secondly, for an exit from the operational corridor C2 corresponding to an excessive lateral swerve with respect to the lateral trajectory TL, as represented in FIG. 5, the anticipated emission of the alarm signal 29 takes account:

of the deviation of course of the aircraft A with respect to said lateral trajectory TL;

of the value of the horizontal acceleration of the aircraft A, projected onto an axis perpendicular to said lateral trajectory TL; and of the horizontal speed of the aircraft A, projected onto said axis.

The invention claimed is:

1. A method for ensuring the safety of a low-altitude flight of an aircraft which is guided along a flight trajectory comprising a lateral trajectory and a vertical trajectory, in which method:

a safety corridor, devoid of any obstacle, is determined which is delimited on either side of said lateral trajectory, and whose width depends on a global uncertainty; and the aircraft is guided along said flight trajectory, avoiding any exit of this aircraft from said safety corridor, wherein an operational corridor is moreover determined which delimits a volume of normal deployment of the aircraft defined about the flight trajectory, both in a vertical plane and in a horizontal plane, and which is such that an exit of the aircraft from said operational corridor is compensatable through a steering of the aircraft, before an exit of said aircraft from the safety corridor.

2. The method as claimed in claim 1, wherein said global uncertainty depends:

on an uncertainty relating to the position of the aircraft;

on an uncertainty relating to a terrain profile used to construct said flight trajectory; and on an uncertainty relating to the guiding of the aircraft along a trajectory.

3. The method as claimed in claim 1, wherein said safety corridor is delimited, in the vertical plane, at the bottom, by the highest part of the terrain existing under an uncertainty surface.

4. The method as claimed in claim 3, wherein said uncertainty surface depends:

on an uncertainty relating to the position of the aircraft;

on an uncertainty relating to a terrain profile used to construct said flight trajectory; and on an uncertainty relating to the guiding of the aircraft along a trajectory.

5. The method as claimed in claim 3, wherein said uncertainty surface exhibits the width of said safety corridor.

6. The method as claimed in claim 1, wherein, during the guidance of the aircraft along the flight trajectory, a check is performed to verify whether the aircraft is situated inside the operational corridor; and an alarm signal of exit of the aircraft from said operational corridor is emitted, as appropriate.

7. The method as claimed in claim 6, wherein said alarm signal is emitted in an anticipated manner, before the actual exit of the aircraft from said operational corridor.

8. The method as claimed in claim 7, wherein, for an exit from the operational corridor corresponding to an excessive lateral swerve with respect to the lateral trajectory, the anticipated emission of the alarm signal takes account:

of the deviation of course of the aircraft with respect to said lateral trajectory;

of the value of the horizontal acceleration of the aircraft, projected onto an axis perpendicular to said lateral trajectory; and of the horizontal speed of the aircraft, projected onto said axis.

9. The method as claimed in claim 7, wherein, for an exit from the operational corridor corresponding to an excessive vertical swerve with respect to the vertical trajectory, the anticipated emission of the alarm signal takes account:

of the deviation of slope of the aircraft with respect to the slope of said vertical trajectory;

of the value of the vertical acceleration of the aircraft, projected onto an axis perpendicular to said vertical trajectory; and of the vertical speed of the aircraft, projected onto said axis.

10. An aircraft, which comprises a device capable of implementing the method as specified in claim 1.

11. A device for ensuring the safety of a low-altitude flight of an aircraft, said device comprising:

first means for determining a flight trajectory comprising a lateral trajectory and a vertical trajectory;

second means for determining a safety corridor, devoid of any obstacle, which is delimited on either side of said lateral trajectory;

third means for avoiding any exit of the aircraft from said safety corridor, during its guidance along said flight trajectory; and means of guidance for guiding the aircraft along said flight trajectory, also comprising means of navigation, wherein said third means comprise means for determining an operational corridor which delimits a volume of normal deployment of the aircraft defined about the flight trajectory, both in a vertical plane and in a horizontal plane, and which is such that an exit of the aircraft from said operational corridor is compensatable through a steering of the aircraft, before an exit of said aircraft from the safety corridor.

12. The device as claimed in claim 11, wherein said third means moreover comprise:

means for verifying that the aircraft is situated inside said operational corridor, during its guidance along said flight trajectory;

means for emitting as appropriate an alarm signal of exit of the aircraft from said operational corridor; and means of steering making it possible to bring the aircraft inside said operational corridor upon the emission of an alarm signal.

13. An aircraft, which comprises a device such as that specified in claim 11.

* * * * *